(12) United States Patent
Best et al.

(10) Patent No.: US 6,531,169 B2
(45) Date of Patent: Mar. 11, 2003

(54) COMPOSITE FOOD COMPOSITION COMPRISING A GEL AND PROCESS FOR ITS PREPARATION

(75) Inventors: Thomas Eric Best, Dublin, OH (US); Paul Ronald Renati, Dublin, OH (US); Peter Harald, Marysville, OH (US)

(73) Assignee: Nestec S.A., Vevey (CH)

( * ) Notice: Subject to any disclaimer, the term of this patent is extended or adjusted under 35 U.S.C. 154(b) by 56 days.

(21) Appl. No.: 09/803,375

(22) Filed: Mar. 9, 2001

(65) Prior Publication Data

US 2002/0192337 A1 Dec. 19, 2002

(51) Int. Cl.[7] .............................. A23G 9/02; A23G 9/14; A23G 9/28
(52) U.S. Cl. ..................... 426/91; 426/134; 426/100; 426/101; 426/575; 426/565; 426/515
(58) Field of Search .................... 426/91, 134, 100, 426/101, 575, 565, 515

(56) References Cited

U.S. PATENT DOCUMENTS

| 4,140,807 | A | * | 2/1979 | Braverman | 426/573 |
| 4,145,454 | A | * | 3/1979 | Dea et al. | 426/565 |
| 4,500,553 | A | * | 2/1985 | Liggett et al. | 426/101 |
| 4,985,623 | A | * | 1/1991 | Klug et al. | 426/302 |
| 6,299,923 | B1 | * | 10/2001 | Meziane | 426/512 |
| 6,399,134 | B1 | * | 6/2002 | Best et al. | 426/565 |

FOREIGN PATENT DOCUMENTS

JP  63052842 A  *  3/1988

* cited by examiner

*Primary Examiner*—Nina Bhat
(74) *Attorney, Agent, or Firm*—Winston & Strawn

(57) ABSTRACT

A composite food composition, in particular a frozen water ice confection in which two or more component phases are present in an intermingled manner that is neither consisting of distinct component blocks of phases, nor present as a fine mixture(s) of phases, and in which at least one of the component phases comprise a polyanionic gel.

10 Claims, 1 Drawing Sheet

COMPOSITE FOOD COMPOSITION COMPRISING A GEL AND PROCESS FOR ITS PREPARATION

TECHNICAL FIELD

The present invention relates to food compositions containing gels, particularly frozen confections containing gels. In particular the present invention relates to a food composition containing polyanionic gel(s) that is (are) present in intermingled format with one or more frozen dessert components. The present invention further teaches a method of preparing such intermingled compositions, particularly for frozen dessert applications.

BACKGROUND ART

JP 2000 004793 relates to an iced dessert with a jelly-like solid item coated with ice cream. This product is jelly-like, not a true gel and is produced by insoluble dietary fiber such as sweet potato fiber.

JP 01016556 relates to the wrapping of a pre-formed jelly around an ice cream. This product contains the separate gel phase in a distinct component block, a coating, not as an intermingled component JP 11187819 relates to a frozen dessert containing sugar alcohols and curdlan. Curdlan is not a polyanionic hydrocolloid. Curdlan is a non-ionic polysaccharide derived from the microbe called A. faecalis and has a linear beta 1–3 glucose backbone. Curdlan is not an approved food material in USA or Europe and the conditions under which it forms its gel are not those used in many of the processes of the food industry. Curdlan is insoluble in cold water and undergoes hydration and subsequent gelation upon heating at above 80° C.

JP 06327421 relates to the use of gelatin at below gel temperature in a freezer, with gelation being inhibited by the presence of high shear from the freezer dasher. This involves the presence of the gel phase in a finely emulsified format, not in an intermingled format.

JP 2000 050802 relates to the formation of a ring design using two fluid ingredients of different color and does not relate to a gel, or to a method of making a gel. Similarly, JP 1999 346659 relates to a swirl design food based upon molding and nozzle devices. It does not relate to a gel, or to a method of making a gel.

DD 152 582 relates to the process of utilizing enzymes to create hydrolysed maize starch that in a heated aqueous suspension forms a dextrinaceous mass (15 DE, dextrose equivalent) that gels upon cooling. This does not relate to a polyanionic gel, or to a method of making a polyanionic gel. It does not relate to a composition containing a separate gel phase, or to a method of making a multi-phase composition.

EPA 0560052 relates to the use of a gelatin coating upon ice cream. This product contains the separate gel phases as a distinct component block, a coating, not as an intermingled component.

U.S. Pat. No. 3,752,678 involves dipping an ice cream into a thixotropic batch containing alginate. Although alginate is a polyanionic gelling agent, this product contains the separate gel phase as a distinct component block, a coating, not as an intermingled component.

U.S. Pat. No. 5,605,712 relates to the use of gel materials as stabilizer elements in the free water phase of ice creams. As such the gel is dissolved and is not present as a separate, visible intermingled phase.

U.S. Pat. No. 5,789,004 relates to microparticulated gels and teaches the achievement of fat mimetics. These gels are so finely mushed that they are invisible and do not provide separate intermingled gel phase components and the multiplex of sensations that are associated therewith.

In any typical multiphase system there is either a tendency for diffusive mixing to occur (at low interfacial tension) or alternatively for globule formation or ultimate separation to occur (at high interfacial tension). Systems rapidly move to one situation or the other. For an intermediate situation to not only occur, but to remain stable enough to be utilized and to be driven in terms of size and shape, is one object of the invention.

Without wishing to be bound by theory, physical interfacial behavior is classically understood to be a function of pressure, temperature and composition. The interfacial properties in particular relate to the rate of deterioration of any multiphase surface area resulting in droplet formation rather than the presence of an intermingled format.

Such behavior is typical of immiscible phases and is the driving force behind sphere formation and/or their ultimate separation into distinct component blocks of each phase.

On the other hand, it is known that when two liquids are alike, especially in terms of their polarity, then the interfacial tension value is low. A low interfacial tension gives internal phases that are not constrained to become spherical, but may adopt more irregular shapes.

Unfortunately, such closeness in the polarity of substances in the liquid phases directly results in high miscibility and spontaneous diffusion, resulting in a mixture rather than a multi-phase system.

Surprisingly, it has now been discovered that a wide range of aqueous compositions in separate phases, and even acidity differences, can be accommodated to create non-spherical interfaces, yet maintain a separation of the phases in an intermingled format for the subject composition.

SUMMARY OF THE INVENTION

The invention thus relates to a composite food composition in which two or more component phases are present in an intermingled manner that is neither consisting of distinct component blocks of phases, nor present as a fine mixture(s) of phases, and in which at least one of the component phases consists of a polyanionic gel. Also, it is preferably a composition in which a multiplex of sensations is achieved both prior and during consumption. In the present composition such sensations are not blurred, and such sensations are not presented in variable ratio from mouthful to mouthful.

Such multiplex of sensations in every bite includes:
Color combinations (hue differences, intensity/weakness, darkness/lightness)
Clarity combinations (opacity, translucency, transparency)
Visual texture (granularity, surface characteristic and geometric shape of phases)
Physical texture (hardness/softness, smoothness/roughness, watery/creamy)
Initial mouthfeel (slow melt/fast melt, refreshing/unctuous, slippery/dry)
Chew (bouncy/smooth, adhesive/lubricating, deformable/resilient)
Sound (squeaky/crunchy)
Taste (sweet/sour, salt/bitter, moistening/astringent)
Flavor (strawberry/cream, mint/chocolate, coffee/rum)
Flavor release (quick/slow, initial impact/later impact, fade away/long lasting, strong/subtle)

The invention also relates to a method for preparing such items. Such method is embodying the ability to form a mixed phase system in a particular manner such that the gel phase forms distinct size and/or shaped particles. Such method being that such particles are resistant to coalescence, flotation, sedimentation or flocculation. Further that such particles develop strong phase boundaries. Also, that such phase boundaries exhibit high elasticity and flexibility to withstand shear forces without rupture. Further, that such phase boundaries present barriers against transfer of moisture, color, flavor etc.

DETAILED DESCRIPTION OF THE PREFERRED EMBODIMENTS OF THE INVENTION

Figure 1:
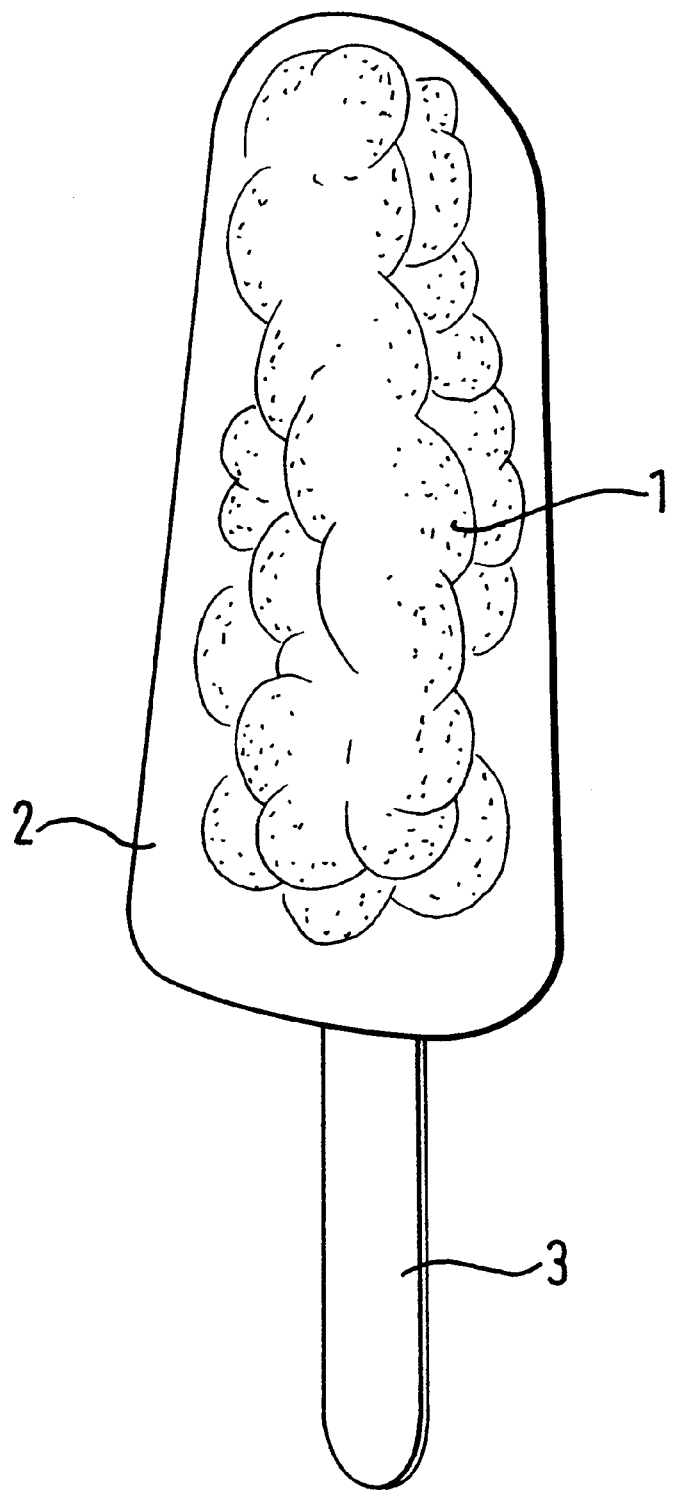
FIG. 1 is a side view of a composite stick ice confection bar that includes a new contrasting aspect and a new contrasted texture of ice and gel as described herrein.

Of key importance is the marked resistance of these special intermingled products to either over-mix or to separate into distinct component blocks during processing. Both directions of event would lead to a loss of utility.

A tendency, on the one hand, to over-mix would lead to the creation of a microscopic "emulsion" type structure or to form a true mixture by physically aided diffusion. This might otherwise especially be likely during the high-speed process lines and pressurized filling operations common to modern manufacturing processes. Such an over-mixed structure loses its appeal, and especially so when the separate phases become of a size close to the acuity of visual, textural or flavor perception of the consumer, or indeed become a true mixture—in fact blurring the whole eating experience.

A tendency, on the other hand, to separate would lead to enormous problems in apportionment during the production of such products. There would be some products or part products excessively high in one component phase or another. Also, there would be a high potential for some products or part products to become completely absent in one phase if apportioned from a separated feedstock.

Separation, even if only partial, would lead to incredible difficulties in labeling issues, such as nutritional statements.

Separation would naturally lead to the loss of the sheer artistry in terms of composing vision, texture, flavor etc. as is capable with this particular composition in terms of the whole eating experience.

It is also a utility to have compositions that are consistent, mouthful to mouthful, in terms of the ratio of the different intermingled phases.

It is of practical importance to have compositions that are themselves (or are parts of) unique products.

It is of practical importance to have a simple method for the preparation of such compositions. Also that such a method can be readily adapted to change the size, shape and ratio of the component phases in such compositions.

There are several main problems that are solved in this current invention. These problems are exemplified in the following description.

Other compositions typically consist of one of the following.
a) They may consist of distinct separate component blocks.
b) They may consist of multi-phase emulsion type systems in which the internal phase adopts fixed geometric (usually spherical) attributes owing to high interfacial tensions.
c) They may exist as true mixtures.

A combination product consisting of distinct component blocks exhibits several issues including the following:
1) Distinct component blocks, such as for example in layers or coatings, tend to have distinct boundary features. These may be prone to physical separation in the same manner that the coating can fall off a "choc ice". The size, the mass and the self-cohesiveness of each distinct component exacerbate this effect.
2) Distinct components tend to be present in larger size. For example, if the textural characteristics of one component exceed those of another component, then the enjoyment of the texture of the weaker component will be lost, as the bite force certainly has to exceed that of the large mass of the stronger material.
3) Further, upon taking different bites, of a composition in which distinct component blocks are present, ratios of the different components so partaken will frequently vary between bites. This is restrictive to the achievement of subtle combinations that require the unique proportions of each component phase to be in a more precise ratio.

Analogies of this latter issue might include taking sporadic mouthfuls of excess strong taste in a character wine or, of periodically inhaling excess note in a fruit fragrance. Inasmuch as combination characters may be subtle, they are yet certainly of high importance. Achieving and ensuring consistent character balance is critical.

A composition which consists of multi-phase emulsion type systems in which the internal phase adopts fixed geometric (usually spherical) attributes owing to high interfacial tensions exhibits several issues including the following.
1) It has its nature and stability directly controlled by the volume content of the internal phase.
2) The size of the internal phase elements is directly constrained by the interfacial tension.
3) The shape of the internal phase is restrained by the interfacial force characteristics.

A combination product that exists as a true mixture exhibits several issues including the following.

It is a fine mixture of the different elements is a blend in which the different elements or phases all lose their individual distinctiveness.

By analogy of this point, one may not create a fine portrait if the colors are all mixed to a uniform mass upon the canvas.

Another point is that unlike the polyanionic gels, studies done have shown that the use of gelatin, which is an amphoteric gel, does not work according to the invention. Gelatin in sol (or pre-gel) form is very liquid and even when mixed with a much colder second phase has a very slow kinetics of solidification. This results in the formation of color mixing, flavor mixing and no obvious boundaries of texture. If the gelatine is deliberately given time to gel (at sufficiently low temperature) it can of course then be cut up and dispersed into a second phase. However, under such circumstances the important intermingled nature of the products of the present invention is completely lost.

In contrast, the polyanionic sol, in the presence of a setting salt, is relying only upon the thermal agitation to prevent a gelation. As soon as the energy of thermal agitation is below a critical level, e.g. by cooling from contact with the other phase which is colder, the gelation occurs with fast kinetics (hereinafter exemplified as "physical control of the intermingling").

Also in contrast, the polyanionic sol, below its gel temperature, is relying only upon the absence of a setting salt to inhibit gelation. As soon as a setting salt is provided, e.g. from contact with the other phase containing it, the gelation occurs with fast kinetics (hereinafter exemplified as "chemical control of the intermingling").

It is thus a key feature of the present invention that the intermingling occurs yet achieving a more random shape and form to the amalgamation that becomes the intermingled composition.

Thus the present invention permits the achieving of that desirable range of attributes pertaining to all the in-between of distinct components and fine mixtures, yet without the added constraints of emulsion type structures.

Thus the present composition is such that distinct components do not wholly lose their identities. Further, the present composition has its component phases present in non-constrained size or shape characteristics. Further the component phases of the present composition maintain their essential and unique blend ratio benefits.

In particular, in the period between gel initiation (accompanied by viscosity build up) and gel consolidation (to complete solidification) in at least one of the phases, gentle agitation may be conducted to achieve the desired non-spherical intermingled structure effect, owing to the low interfacial tension. During this period, the liquid/fluid interface becomes elastic and converts to a liquid/solid interface.

In the period between gel consolidation (in at least one of the phases) and freezing, the desired non-spherical intermingled structure is resistant to deformation. Once the whole composition is solidified by for example being frozen, further interfacial surface deformation is of course inhibited.

In part, the particular shape-retaining benefits have been found to be due to the elasticity and the flexibility of the formed gel phase surfaces that retain their interesting shapes during transient process stages.

Further aspects to shape-retaining benefits include the appropriate electro-kinetic phenomena such as electron double layer affects upon the liquid flows and upon the particle interactions, and further upon the electro-osmotic flows. Such factors include the inhibition of potential collapse together of the created gel particles owing to the localized polyanionic charges upon the hydrocolloid species causing like charge repulsion between separately formed entities of the gel phase.

Unlike other systems, excessive droplet break up in a stirred tank does not occur. Further, resistance to such droplet break up is not driven by a high interfacial tension force (as it is in an emulsion). Also, it is not mainly inhibited by the viscosity of any continuous phase, which may be low. Rather, under such circumstances, the intermingled non-spherical shapes undergo temporary stretching and snapping is avoided by the ability of these gel shapes to absorb the stresses of re-orientation and tumbling owing to their natural elasticity. Such elasticity initially presents at the gel shape surfaces and at later stages of the process, throughout their structure.

The tendency to diffusive mixture formation has been countered in the present invention by the spontaneous gelation of at least one of the phases, owing to the presence of polyanionic hydrocolloids.

Diffusion mixing does not occur, yet also spherical droplets or bubbles are not formed, and separation into distinct component blocks does not occur.

In a polyanionic hydrocolloid stabilized interfacial system, other new benefits emerge.

While in the state of liquid/gel amalgamation, the system has been found to be sufficiently stable to withstand processing up to and including freezing of the whole composition into a solid mass.

The frozen dessert component phase(s) might or might not itself also be, or contain, a polyanionic gel phase.

Such multi-phase composition(s) may, of course, themselves be either products, or parts of products.

Although such multiphase compositions contain component phases that are intermingled; in no way should they be construed as being "mixed together" or "blended together". In fact a key element of the present composition is that the separate phases do indeed interact, during their amalgamation, in a specific manner that causes them to fuse together, yet without the loss of their separate integral natures.

Similarly, intermingled in no way infers that the gel phase is separate as a distinct component block such as a coating, a filling, a layer, a rope or as laminations.

Similarly, intermingled in no way infers the presence of the gel phase as a classic emulsion phase in which size and geometry (typically spherical) of the internal phase is specifically driven by interfacial forces. In particular, intermingled in the present sense denotes of form and size-driven more by processing conditions than by inherent physical chemistry constraints.

By controlling simple process attributes, such as the mechanism, the shear rate and the temperature of amalgamation, not only the particulate sizes of the independent phase elements, but also the physical geometry of these elements is controllable.

A typical product of the present invention may for example have one phase resembling the convolutions of the human brain embedded within another phase. Another typical product may have two phases resembling the multi-colored facets of marbling, or these same two phases be present within a third translucent phase. Yet another may have the appearance of a camouflage. Or another, have one phase extant in certain deliberately formed geometry such as flecks, speckles, ellipsoid, needle, lobate, villiform, crenellated or other shaped entities.

The key features extend far beyond mere visual appearances such as color and clarity. The multiphase nature of the composition permits other multiplexed sensations, such as texture, mouthfeel, flavor, flavor release etc. upon consumption.

The polyanionic gel phase present as a component of the present intermingled composition may itself be a mixture of polyanionic gelling hydrocolloids such as carrageenan+pectin.

It is also possible to have different polyanionic gelling hydrocolloids present in situations where the different polyanionic hydrocolloids reside with each type in separate gel component phases of the present composition. For example, a system might be containing both carrageenan phases and pectin phases. In such a situation, each intermingled gel particle might for example be either carrageenan or pectin, but not both carrageenan and pectin.

Other polyanionic gelling hydrocolloids would include most marine (or seaweed) extracts such as agar, alginate, furcelleran etc., and certain of the microbial polysaccharides (gellan, xanthan, succinoglycan etc.).

Some other polyanionic hydrocolloids, such as CMC that do not themselves form gels, may be beneficially included in the polyanionic gel components of the present composition, for the purposes of modulation of physical properties.

Similarly, other non-polyanionic hydrocolloids may be beneficially included in the polyanionic gel components of the compositions. For example, neutral hydrocolloids that do not typically form gels on their own, may for example be included in the polyanionic gel components of the present composition for the achievement of textural and other modifications.

Such neutral hydrocolloids would include all the uncharged seed gums, particularly the galactomannans, certain extrudate gums, and even some root cell polysaccharides such as Konjac.

In one embodiment of the present invention, a sol (liquid that will form a gel) containing a polyanionic gelling agent (or combination thereof) is prepared and gelation potential is initiated by the addition of the appropriate setting salts. Holding the mass at a temperature just above the gel temperature inhibits gelation. A secondary phase (that is at a temperature just below this first phase's gelation temperature) is amalgamated. The composition is agitated during the addition and a physical interaction occurs between the phases. The drop in temperature causes the sol phase to convert into a highly viscous mass inhibiting diffusion mixing with the colder phase. Yet the similarity in polarities between the two phases prevents effective interfacial tension forces forming. The substantial absence of these forces prevents driving one or other of the phases into either spherical droplet formation or into separation into distinct component blocks. This is because there is little need to minimize interfacial surface areas. This amalgamated composition is sheared sufficiently to create the desired phase dimensions in the particles of the viscous phase. Continued cooling causes the viscous sol phase to gel into elastic particles that are well intermingled with the other phase.

In another embodiment of the present invention, a sol (liquid that will form a gel) containing a polyanionic gelling agent (or combination thereof) is prepared but gelation potential is not initiated by presence of the appropriate setting salts. In this case, the sol may be held at temperatures below those at which it would have gelled had setting salts been present. In this case, a second phase that contains the setting salts is amalgamated with the sol phase. The composition is agitated during the addition and a chemical interaction occurs between the phases. The contact with the setting salts causes the sol phase to convert into a highly viscous mass inhibiting diffusion mixing with the other phase. Yet the similarity in polarities between the two phases prevents effective interfacial tension forces forming. The substantial absence of these forces prevents driving one or other of the phases into either spherical droplet formation or into separation into distinct component blocks. This is because there is little need to minimize interfacial surface areas. This amalgamated composition is sheared sufficiently to create the desired phase dimensions in the particles of the viscous phase. Continued diffusion of the small size setting salt ions causes the viscous sol phase to gel into elastic particles that are well intermingled with the other phase.

In yet another embodiment, the sol (liquid that will form a gel) may be introduced into another phase by vibrating injection needles and gelation may be achieved either by thermal or chemical means.

Other embodiments may similarly be adopted in which combinations of both physical and chemical interactions between the phases cause the desired effects.

The resultant composition achieved by one or more of the above embodiments may continue to be agitated without damage to the shape, size or form, once one of the phases has converted into a gel.

The resultant composition may be shaped or formed by any of the well known techniques such as molding, layering, rope formation, enrobing, dipping, lamination, co-extrusion, or any of hosts of other shaping possibilities.

The composition may itself be one or more components of a multi-component product.

One or more of the phases in the multi-phase composition may additionally contain other substances including other gels, fluid masses, gases, and solids such as lipid components or others.

In the particular application for frozen desserts, the respective proportions by weight of sol/ice mix could go from about 10/90 to about 90/10, and preferably from about 50/50 to about 70/30.

Preferably, the gel phase of the food composition comprises less than about 50% by weight soluble solids.

EXAMPLES

The invention is further illustrated by reference to the following Examples describing in detail the products and methods of the present invention. The examples are representative and should not be construed to limit the scope of the invention in any way. In the following Examples, parts and percentages are by weight unless stated otherwise.

Example 1

This Example Demonstrates the Use of Physical Control of the Intermingling and the Production of a Composite Water Ice Bar a) A sol "A" was prepared from the ingredients indicated in Table 1 below by using the method of preparation indicated below.

TABLE 1

| Ingredient | % |
| --- | --- |
| Before pasteurisation | |
| Water | 62.59 |
| Sucrose | 25.00 |
| Glucose Syrup, 36 DE, 80% solids | 10.00 |
| Carrageenan (kappa) | 0.24 |
| Locust bean gum (LBG) | 0.20 |
| After pasteurisation | |
| Potassium chloride aqueous solution, 10% solids | 0.75 |
| Citric acid aqueous solution, 50% solids | 1.00 |
| Flavor A | 0.20 |
| Color A solution | 0.02 | b) A water ice mix "B" was separately prepared with the ingredients as indicated in Table 2 below by using the method of preparation indicated below:

TABLE 2

| Ingredient | % |
| --- | --- |
| Before pasteurisation | |
| Water | 74.74 |
| Sucrose | 17.14 |
| Glucose Syrup, 36 DE, 80% solids | 5.71 |
| Guar gum | 0.20 |
| After pasteurisation | |
| Citric acid solution, 50% solids | 2.00 |
| Flavor B | 0.20 |
| Color B solution | 0.02 | c) Method of Preparation

Sol A Preparation

1. The water was added to a tank.
2. The hydrocolloids (carrageenan and LBG) were added to water and agitated under high shear. Agitation was maintained until solution was confirmed (lack of visible solid particles adhering to an inserted rod).

3. The sucrose was added under high shear agitation.
4. Glucose syrup was added and blended.
5. The sol was then pasteurised at 85° C. on an HTST (high temperature short time) plant and held at 50° C.
6. The remaining ingredients for the sol were incorporated and blended and held at 50° C. under gentle stirring.

Mixing time, in general, depends upon the mixer speed and the product viscosity. Mixing time should be minimized to that required for obtaining uniformity in the product. This time may be established by observing the distribution of the color added to the sol during the operation. Excess mixing times, such as might result from too slow stirring, should be avoided, as in such a case shear damage to a forming gel might result.

Water Ice Mix B Preparation
1. The water was added to a tank.
2. Guar gum was added to water and agitated under hich shear.
3. The sucrose was added under high shear agitation.
4. Glucose syrup was added and blended.
5. The mix was then pasteurised at 85° C. on an HTST (high temperature short time) plant, cooled to and held at 4° C.
6. The remaining ingredients for the mix were incorporated and blended and the whole held at 4° C. under gentle stirring.

The sol A and water ice mix B were then combined with stirring to achieve the desired appearance prior to dosing into a mold to shape the product as desired. To that effect, the sol A and the water ice mix B of contrasted colors were dosed from their respective holding tanks in a hopper where they were blended by stirring and the resulting mixture with the desired appearance was then dosed into molds travelling through a refrigerated brine bath. The proportions of sol A/water ice mix B were 50/50. It can be 50/50 or 70/30 or at any selected ratio inbetween.

Sticks were inserted, the products quiescently frozen, demolded by heating the surface of the molds, surface-hardened, wrapped and stored at −30° C.

The composite stick bars so produced had a new contrasting aspect and a new contrasted texture of ice and gel as illustrated in FIG. 1. One phase 1 resembled the convolutions of the human brain embedded within the other phase 2 and the bar had a stick 3.

Example 2

This Example Demonstrates the Use of Chemical Control of the Intermingling and the Production of a Composite Water Ice Bar a) A sol "C" was prepared from the ingredients indicated in Table 3 below by using the method of preparation indicated below

TABLE 3

| Ingredient | % |
| --- | --- |
| Before pasteurisation | |
| Water | 63.34 |
| Sucrose | 25.00 |
| Glucose Syrup, 36 DE, 80% solids | 10.00 |
| Carrageenan (kappa) | 0.24 |
| Locust bean gum (LBG) | 0.20 |
| After pasteurisation | |
| Citric acid aqueous solution, 50% solids | 1.00 |
| Flavor C | 0.20 |
| Color C solution | 0.02 | b) A water ice mix "D" was separately prepared with the ingredients as indicated in Table 4 below by using the method of preparation indicated below.

TABLE 4

| Ingredient | % |
| --- | --- |
| Before pasteurisation | |
| Water | 73.99 |
| Sucrose | 17.14 |
| Glucose Syrup, 36 DE, 80% solids | 5.71 |
| Guar gum | 0.20 |
| After pasteurisation | |
| Potassium chloride aqueous solution, 10% solids | 0.75 |
| Citric acid solution, 50% solids | 2.00 |
| Flavor D | 0.20 |
| Color D solution | 0.02 | c) Method of preparation
Sol C Preparation
1. The water was added to a tank.
2. The hydrocolloids (carrageenan and LBG) were added to water and agitated under high shear. Agitation was maintained until solution was confirmed (lack of visible solid particles adhering to an inserted rod).
3. The sucrose was added under high shear agitation.
4. Glucose syrup was added and blended.
5. The sol was then pasteurised at 85° C. on an HTST (high temperature short time) plant and held at 4° C.
6. The remaining ingredients for the sol were incorporated and blended and held at 4° C. under gentle stirring.

Mixing time, in general, depends upon the mixer speed and the product viscosity. Mixing time should be minimized to that required for obtaining uniformity in the product. This time may be established by observing the distribution of the color added to the sol during the operation. Excess mixing times, such as might result from too slow stirring, should be avoided, as in such a case shear damage to a forming gel might result.

Water Ice Mix B Preparation
1. The water was added to a tank.
2. Guar gum was added to water and agitated under high shear.
3. The sucrose was added under high shear agitation.
4. Glucose syrup was added and blended.
5. The mix was then pasteurised at 85° C. on an HTST (high temperature short time) plant, cooled to and held at 4° C.
6. The remaining ingredients for the mix were incorporated and blended and the whole held at 4° C. under gentle stirring.

The sol C and water ice mix D were then combined with stirring to achieve the desired appearance prior to dosing into a mold to shape the product as desired. To that effect, the sol C and the water ice mix D of contrasted colors were dosed from their respective holding tanks in a hopper where they were blended by stirring and the resulting mixture with the desired appearance was then dosed into molds travelling through a refrigerated brine bath. The proportions of sol C/water ice mix D were 50/50. It can be 50/50 or 70/30 or at any selected ratio inbetween. Sticks were inserted, the products quiescently frozen, demolded by heating the surface of the molds, surface-hardened, wrapped and stored at −30° C.

The composite stick bars so produced had a new contrasting aspect and a new contrasted texture of ice and gel. It resembled a camouflage.

What is claimed is:

1. A composite food composition in which two or more component phases are present in an intermingled manner that is neither consisting of distinct component blocks of phases, nor present as a fine mixture(s) of phases, and in which at least one of the component phases comprise a polyanionic gel.

2. A composite food composition according to claim 1, which is a frozen confection comprising polyanionic gel(s) with one or more distinct phases consisting of frozen dessert components, wherein the distinct phases are present in intermingled format and are not mixed, nor emulsified, nor present in distinct component blocks.

3. A composite food composition according to claim 1, in which the gel phase(s) have a non-sperical shape.

4. A composite food composition according to claim 1, in which the polyanionic gel is based on kappa-carrageenan.

5. A composite frozen confection according to claim 2 in the form of a stick bar.

6. A composite frozen confection according to claim 5, comprising a contrasting aspect and a contrasted texture of ice and gel and in which one phase resembles the convolutions of a brain embedded within the other phase.

7. A composite frozen confection according to claim 5, comprising a contrasting aspect and a contrasted texture of ice and gel and resembling a camouflage.

8. A method for preparing a composite food composition according to claim 1, in which the gel phase is formed "in situ" either by physical or chemical means.

9. A method for preparing a composite frozen confection, which comprises making two mixes, one with an anionic gelling hydrocolloid at a temperature higher than the gelling temperature of the said hydrocolloid, the other with a water ice and a setting salt at a temperature lower than the gelling temperature of the said hydrocolloid, blending the two mixes to achieve the desired appearance of intermingled phases and so to form the gel phase by physical means, filling the blended mixes into molds, quiescently freezing, inserting sticks, demolding and packaging the stick bars.

10. A method for preparing a composite frozen confection, which comprises making two mixes, one with an anionic gelling hydrocolloid at a temperature slightly lower than the gelling temperature of the said hydrocolloid, the other with a water ice and a setting salt at a temperarure slightly lower than the gelling temperature of the said hydrocolloid, blending the two mixes to achieve the desired appearance of intermingled phases and to form the gel phase by chemical means, filling the blended mixes into molds, quiescently freezing, inserting sticks, demolding and packaging the stick bars.

* * * * *

UNITED STATES PATENT AND TRADEMARK OFFICE
CERTIFICATE OF CORRECTION

PATENT NO. : 6,531,169 B2
DATED : March 11, 2003
INVENTOR(S) : Best et al.

It is certified that error appears in the above-identified patent and that said Letters Patent is hereby corrected as shown below:

Column 11,
Line 15, change "non-sperical" to -- non-spherical --.

Column 12,
Line 18, change "temperarure" to -- temperature --.

Signed and Sealed this

Twenty-second Day of July, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,531,169 B2
DATED         : March 11, 2003
INVENTOR(S)   : Best et al.

It is certified that error appears in the above-identified patent and that said Letters Patent is hereby corrected as shown below:

<u>Title page,</u>
Item [75], Inventors, change to -- Eric Thomas Best --, from "Thomas Eric Best".

Signed and Sealed this

Sixteenth Day of September, 2003

JAMES E. ROGAN
*Director of the United States Patent and Trademark Office*